United States Patent Office 2,802,783
Patented Aug. 13, 1957

2,802,783

DRILLING FLUID

Walter J. Weiss, Sugar Land, and Wilbur L. Hall, Bellaire, Tex., assignors to The Texas Company, New York, N. Y., a corporation of Delaware No Drawing. Application July 9, 1956,
Serial No. 596,456

29 Claims. (Cl. 252—8.5)

This invention relates to the drilling of wells through subsurface formations by means of well drilling tools. More particularly, this invention relates to a drilling operation, such as a rotary drilling operation, which involves circulation of a drilling fluid through the well bore and about the drilling bit. In a rotary drilling operation a drilling fluid is pumped down the drill stem to the drilling bit at the bottom of the bore hole. The stream of drilling fluid then passes through the drilling bit and moves upwardly through the annular space between the drill stem and the well bore wall carrying with it the drilling cuttings.

In some areas, such as in the area of the Gulf Coast of Texas and Louisiana, formations known as heaving or sloughing shales are penetrated during a well drilling operation. The penetration of these formations while employing conventional aqueous or water-base drilling fluids has been difficult due to the mud-making characteristics or properties of heaving shales. These shales have a tendency to disintegrate by swelling or cracking upon contact with water with the result that the walls of the bore hole become unstable or incompetent and the heaving shale material making up the walls of the bore hole becomes unstable and sloughs into the bore hole. In some instances the sloughing or moving of this heaving shale material into the bore hole results in a stuck drill stem. In other instances the heaving shale material swells and sloughs or caves into the bore hole with a resulting enlargement of the bore hole and the formation of large subterranean cavities.

In addition to the above-indicated difficulties of maintaining a true bore hole when drilling through heaving shale material with a conventional water-base mud, the resulting finely dispersed heaving shale material taken up into the drilling fluid, because of the mud-making properties of heaving shale, adversely affects the viscosity characteristics of the drilling fluid. Upon a continued accumulation of these finely divided heaving shale particles in the drilling fluid the viscosity of the drilling fluid increases with the result that the drilling fluid must be thinned by the addition of costly chemicals thereto or by dilution with water. If the drilling fluid is thinned by water dilution the addition of more weighting material such as barium sulfate (barytes), iron oxide, lead sulfide (galena) and the like is necessary to maintain a given mud weight.

Special drilling fluids or muds have been developed for drilling through heaving shale formations. One such drilling fluid which has been employed for drilling through heaving shale formations is a drilling fluid containing aqueous sodium silicate. Another drilling fluid which has been proposed for use during a drilling operation while drilling through less seriously dispersing or heaving shale formation is a high pH, lime-base drilling fluid which contains lime together with quebracho, caustic soda, water and the conventional hydratable bentonitic type of drilling clay. High pH, lime-base drilling fluids, however, cannot be employed without considerable difficulty while drilling through the more seriously heaving shale formations. Additionally, a high pH, lime-base drilling fluid is sensitive to salt contamination, such as contamination by calcium chloride or calcium sulfate, which causes clay flocculation with a resulting increase in viscosity and water-loss. Although in some instances the desirable viscosity, mud weight and water-loss properties of a high pH, lime-base drilling mud can be maintained while drilling through a heaving shale formation by the addition of suitable additives, such as the addition of caustic soda and quebracho and the like, the continued addition of these additives to the drilling fluid usually involves considerable expense.

Accordingly it is an object of this invention to provide an improved drilling fluid particularly suitable for drilling through troublesome shale formations of the heaving, sloughing or rapidly dispersing type.

It is another object of this invention to provide a reagent material suitable for the preparation and/or maintenance of a drilling fluid useful for drilling through troublesome shale formations of the heaving, sloughing or rapidly dispersing type.

It is another object of this invention to provide a drilling fluid which is capable of being more readily maintained at a given weight or density while being employed as a drilling fluid during drilling through heaving or sloughing shale formations.

It is another object of this invention to provide a drilling fluid which is relatively insensitive to salt (NaCl) contamination, or to calcium ion contamination, such as may arise while drilling through a gypsum bed or upon encountering a high pressure salt water flow.

It is another object of this invention to provide an aqueous drilling fluid which readily converts heaving shale material exposed in the well bore into a more stable, competent material.

It is another object of this invention to provide a drilling fluid additive suitable for the preparation of an aqueous drilling fluid which readily converts heaving shale material exposed in the well bore into a more competent material.

Yet another object of this invention is to provide a drilling fluid reagent material or admixture suitable for the preparation of an alkaline aqueous drilling fluid characterized by a relatively high dissolved calcium or calcium ion content.

These and other objects of this invention and how they are accomplished will become more apparent in the light of the accompanying disclosure. In at least one embodiment of this invention at least one of the foregoing objects will be achieved.

In accordance with this invention we have provided an alkaline aqueous or water-base drilling fluid particularly suitable for drilling through a heaving shale formation, said fluid being characterized by a relatively high dissolved calcium or calcium ion content sufficient to effectively stabilize and control the mud-making properties of heaving shale material or clays in contact with the drilling fluid. More particularly, we have provided an improved aqueous drilling fluid comprising an alkaline aqueous phase (filtrate phase) which is substantially saturated with respect to calcium hydroxide and which contains a water-soluble calcium salt having a solubility in said aqueous phase greater than that of calcium hydroxide dissolved therein in an amount sufficient to yield a calcium or calcium ion concentration in said aqueous phase of at least about 200 parts per million (p. p. m.) by weight.

A drilling fluid in accordance with this invention would contain water, conventional dispersed hydratable drilling clay material together with a suitable dispersing agent for the clay material, a water-soluble calcium salt and an alkalinity agent. Still in accordance with this invention, we have provided a drilling fluid reagent admixture suitable for the preparation of such a drilling fluid or suitable for the preparation of the alkaline aqueous phase thereof.

A drilling fluid in accordance with the practice of our invention may be prepared in the first instance by the addition of the drilling fluid reagent admixture to water or to a water containing hydratable clayey material together with the usual, conventional drilling mud additives (water loss additive, weighting material, clay dispersing or viscosity reducing agent, emulsifying agent and the like), if desired, or a conventional aqueous drilling fluid may be converted (broken over) to a drilling fluid in accordance with our invention by the addition thereto of the reagent admixture disclosed herein or by the separate addition of the various components making up the reagent admixture of drilling fluid in accordance with the teachings of this invention.

In the breaking over of a conventional aqueous drilling mud (water base or oil-in-water emulsion mud) to a drilling fluid in accordance with this invention a conventional water-containing or water-base drilling fluid containing the usual dispersed hydrated drilling clay is thinned in order to reduce the viscosity of the fluid so that upon the addition of the water-soluble calcium salt thereto excessive thickening does not occur so that an unpumpable drilling fluid results. It has been found that thinning a clay-water drilling fluid to a value between about 20–30 centipoises, as measured at 600 R. P. M. by the Stormer viscosimeter prior to the addition of the water-soluble calcium salt thereto, usually permits a satisfactory, substantialy trouble-free conversion of the fluid. The added water-soluble calcium salt causes a visible thickening of the fluid due to calcium ion flocculation of the hydrated drilling clay. This thickening is not nearly so severe as is the case when lime (which may be quicklime or hydrated lime, calcium hydroxide) alone is added to the drilling fluid. During conversion the water-soluble calcium salt is conveniently added to the drilling fluid slightly above the location where the mud ditch flows into the mud pit in order to insure adequate mixing of the added soluble calcium salt with the drilling fluid or mud prior to the addition of the other materials which are added in accordance with our invention.

Simultaneous with the addition of the soluble calcium salt to the mud an alkalinity agent, preferably calcium hydroxide (lime), for pH adjustment, and a dispersing agent for the clayey material in the mud are added to the mud in the pit. After the drilling mud has been satisfactorily converted the conventional mud additives, such as may be required to control or reduce water loss or to control mud weight, can be added as needed to maintain the desired mud properties.

Any water-soluble calcium salt may be employed in a preparation of a drilling mud or the drilling mud reagent or additive admixture in accordance with our invention provided the calcium salt is more soluble in water, e. g., as measured at room temperature of about 15° C., than calcium hydroxide $Ca(OH)_2$ and provided the calcium salt when added to water produces or generates the desired free, dissolved calcium or calcium ion content or concentration necessary in the practice of this invention. Satisfactory soluble calcium salts which may be employed in the practice of this invention include: calcium chloride $CaCl_2$, calcium sulfate $CaSO_4$, calcium acetate $Ca(C_2H_3O_2)_2$, calcium formate $(Ca(CHO_2)_2$, calcium nitrate $Ca(NO_3)_2$, calcium gluconate $$Ca(CH_2OH(CHOH)_4.COO)_2$$

Other suitable water calcium salts may be employed. The water-soluble calcium salt may be employed in any suitable or commercially available form, anhydrous, partially or fully hydrated, flaked, powdered, prilled, lump, granular, and the like.

The alkalinity agent employed in the preparation of a drilling fluid or the drilling mud reagent or additive admixture in accordance with this invention is preferably lime. The lime may be employed in any suitable or commercially suitable form, anhydrous, partially or fully hydrated, lump, granular, powdered and the like. Lime or calcium hydroxide is advantageously employed since it serves to provide the desired alkalinity in the aqueous phase (an alkaline aqueous phase having a pH not greater than 12.6). Secondarily, it also phoduces or generates dissolved calcium or calcium ions which, of course, contribute to the maintenance of the desired calcium concentration in the aqueous alkaline phase. Other suitable alkalinity agents are ammonium hydroxide and the alkali metal hydroxides such as caustic soda (NaOH) which in aqueous solution in the presence of added water-soluble calcium salt by metathetical reaction produces calcium hydroxide in situ within the drilling fluid, the added water-soluble calcium salt being added or present in stoichiometric excess with respect to the alkalinity agent. It is mentioned that the alkalinity agent employed in the subject drilling mud functions primarily as an alkalinity agent to peptize the clay-dispersing agent. Calcium hydroxide as an alkalinity agent only incidentally functions as a calcium ion donor to the aqueous phase to modify or convert the shale since the shale is converted primarily and predominantly by the calcium ions or rather the relatively high concentration of calcium ion in the aqueous phase produced therein by the addition of the water-soluble calcium salt to the drilling fluid.

Any suitable dispersing agent or surface active agent (surfactant) may be employed in the preparation of a drilling fluid or the drilling mud reagent or additive admixture in accordance with this invention provided it is compatible with its environment in the additive admixture or in the drilling mud, i. e., it is not salted out and does not undergo a chemical reaction or a physical or chemical change which would render it unsuitable or useless as a dispersing agent, and provided it exhibits sufficient dispersing power in the drilling fluid to disperse the drilling clay material within the drilling fluid. An especially satisfactory clay dispersant is a lignosulfonate, especially lignosulfonates derived by the Marathon-Howard Process from softwoods, such as an alkaline earth metal or an alkali metal lignosulfonate, e. g., calcium lignosulfonate or sodium lignosulfonate, respectively. A lignosulfonate such as calcium lignosulfonate, e. g., Kembreak, is preferred as the dispersing agent in drilling muds or in the additive admixtures in accordance with this invention. Another suitable dispersing agent is a commercially available material known in the trade as yellow dextrin, which essentially is a degradation product of starch. Another suitable dispersing agent is a predominantly sodium salt of a polymeric polyphenol derivative, apparently obtained as an extract of hemlock bark, sold under the trade name Rayflo by the Rayonier Co., Inc.

The drilling fluids may also include the usual water-loss additives such as a prehydrolyzed starch commercially available under the trade name Impermex, carboxymethylcellulose (CMC) and the like. It has been observed that an oil-in-water emulsion drilling fluid prepared in accordance with this invention exhibits low water-loss properties as compared with an oil-free, water-base mud prepared in accordance with this invention. Presumably the dispersed, emulsified oil phase, usually a diesel oil fraction, inhibits or aids in inhibiting water loss.

As indicated hereinabove, in accordance with one feature of this invention there is provided a reagent or drilling mud additive admixture, preferably in solid form, but which might be in aqueous slurry form, which when added to water, which may or may not contain a drilling clay, such as a bentonitic type drilling clay, therein, provides the desired alkalinity and calcium ion content in the aqueous or filtrate phase of the aqueous drilling fluid to which it is added. Such a reagent or additive admixture would contain a water-soluble calcium salt, such as calcium chloride, lime or calcium hydroxide and a clay-dispersing agent such as a calcium lignosulfonate, e. g., Kembreak. The composition of such an admixture containing a water-soluble calcium salt, such as calcium chloride, alkalinity agent, such as lime or calcium hydroxide, and dispersing agent, a lignosulfonate such as Kembreak, is usually in the weight ratio range 1:2–6:2–10, respectively; preferably in the additive admixture the weight ratio of the alkalinity agent, lime, to dispersing agent, Kembreak, is in the range 1–1.5. It is realized that the above-indicated weight ratio range is open to modification and adjustment depending upon the equivalent or molecular weights of the components making up the admixture, e. g., whether employed in anhydrous or hydrated form, and depending upon the effective activity of the components employed therein. A reagent or additive admixture containing calcium chloride, lime and calcium lignosulfonate (Kembreak) in the weight ratio of about 1:3:3 has been found in actual practice to be very useful.

A typical unweighted drilling mud prepared in accordance with this invention and containing 1½ lbs. of calcium chloride per barrel of drilling fluid, 3 lbs. of calcium lignosulfonate (clay-dispersing agent) per barrel of drilling fluid, and 2 lbs. of lime (alkalinity agent) per barrel of drilling fluid, would exhibit the following properties:

Mud weight—about 10 lbs. per gallon
Mud viscosity—about 40 seconds API (1500/1 qt.)
Gel strength:
    0 min.—0
    10 min.—about 5–10 grams
$P_f$*=0.5
$M_f$†=1.0
$P_m$‡=8–10
Free lime—1.0–1.1 lbs. per barrel
Chloride ion—about 3000 p. p. m. above the value in mud prior to conversion
Calcium ion—about 400 p. p. m. as determined by the standard versenate method described in API Code RP-29
pH—about 11.9
Water loss—about 8 cc. after the addition of 4 lbs. of starch per barrel of drilling fluid.

\* $P_f$ is defined as number of cc. of N/50 H₂SO₄ required to titrate 1 cc. of aqueous phase (filtrate) of drilling fluid to a phenolphthalein end point and is a measure of the soluble hydroxyl ion content.
† $M_f$ is defined as number of cc. of N/50 H₂SO₄ required to titrate 1 cc. of aqueous phase (filtrate) of drilling fluid to methyl orange end point and is a measure of the soluble hydroxyl and carbonate ion content.
‡ $P_m$ is defined as number of cc. of N/50 H₂SO₄ required to titrate 1 cc. of the whole mud.

In a drilling mud prepared in accordance with this invention by the addition of calcium chloride (calcium ion donor), calcium lignosulfonate (dispersant) and lime (alkalinity agent), separately or in any suitable admixture, the lime acts primarily as an alkalinity agent to peptize the calcium lignosulfonate which, adsorbed on the calcium-base converted drilling clay particles, serves to disperse these clay particles. In the conventional high pH, lime-base drilling muds, the lime is added to convert the dispersed clay and caustic soda is added to peptize the clay dispersant and at the same time to suppress lime solubility (calcium ion concentration) by the common ion effect so as to inhibit the flocculating action of lime (calcium ion) upon the drilling clay. By maintaining the presence of free lime in the subject drilling muds, i. e., maintaining the aqueous phase saturated with respect to lime in the presence of a dissolved calcium salt (added calcium ion), the pH of the aqueous phase is never greater than 12.6, which value corresponds to the pH of a saturated aqueous solution of lime. The presence of calcium ions originating from the soluble calcium salt added to the drilling fluid causes the pH of the aqueous phase to be somewhat lower than 12.6, generally in a pH range 11.2–12.5, or lower, because of the common ion effect. In the usual practice of this invention drilling fluid is maintained at a pH in the range 11.7–12.2.

It has been observed that a lignosulfonate clay-dispersing agent, such as calcium lignosulfonate, in the presence of lime tends to improve the water-loss properties of the mud. It is preferred that in the reagent admixture or in the drilling fluid the weight ratio of lime to dispersing agent, e. g., lime to calcium lignosulfonate, be in the range 1–1.5 to the drilling fluid. However, for reasons of economy it would be desirable whenever possible to increase the lime to dispersing agent ratio to 2:1, or at least 3:2. Also it has been found desirable during drilling operations when drilling through heaving shale formations to maintain the free lime content, i. e., excess, undissolved lime, in the drilling mud at a value in the range 0.75–4 lbs. per barrel, preferably in the range 1.5–1.8 lbs. per barrel, thereby providing a reservoir to act as a stabilizer of the alkalinity and the soluble calcium ion content of the drilling mud. Accordingly, it is preferred during active shale drilling that the free lime content of the drilling mud should not be permitted to fall below 1.5 lbs. per barrel. Actual field practice has indicated that the need for lime and dispersant (lignosulfonate) addition is advisable whenever the free lime content of the mud falls below 1.5 lbs. per barrel or when the $P_f$ reaches 0.4 cc. N/50 H₂SO₄ (pH of below about 11.7).

The gel strength of the subject muds is somewhat different from the other conventional muds. For example, phosphate drilling muds have very low initial gel strength but the gel strength of phosphate muds usually continue to rise slowly with time until very high strength, almost rigid, gels are developed. Conventional lime base muds such as a high pH, lime-base and wherein the dissolved calcium content seldom rises above 20–40 parts per million by weight, exhibit a flash gel which is so flat as to appear to be practically non-existent (0–0) at proper solids-water ratios. The subject calcium-base muds, however, are distinguishable by possessing an initial gel strength which is very low, the gel strength rising with time to a limited and relatively low value. The rate of gel strength increase or gel formation is moderate and is discernible in a standard ten minute test. The conventionally measured gel strength values of the subject muds normally run about 0–5 grams to 0–30 grams on a 0–10 minute test. Evidence that the gel strength of the subject muds never rises to a high value is established by the fact that when a drilling mud prepared in accordance with this invention was recovered and reclaimed from an earthen mud pit where it had lain substantially undisturbed for 32 days, the mud was readily picked up by vacuum trucks and was completely refluidized in the process.

Drilling muds prepared in accordance with this invention have been adjusted to a high density of mud weight without exhibiting any anomalous reactions. The weighting performance of the subject muds has been highly satisfactory and little or no incidental water dilution or increased chemical treating has been required as mud weight is increased. Undoubtedly the ability of the subject muds to satisfactorily maintain a high density in the presence of seriously dispersing heaving or mud making shales is due to the stability of the clay-water ratio which these muds exhibit because of their excellent shale-suppressing properties.

Drilling muds prepared or converted in accordance with this invention do not exhibit undue high temperature gelation although upon the accumulation of solids and at high viscosities and temperatures, gelation is noted when these subject muds are subjected to a temperature of 350° F. for a period of 64 hours. This high temperature gelation effect actually observed in the field, however, is not worse than that noted in conventional high pH, lime-base muds employed in the same general area.

The resistance of the subject muds to gypsum contamination is excellent and salt (NaCl) resistance at least up to about 50,000 p. p. m. is satisfactory.

The heaving shale stabilizing property of the subject drilling fluids brought about by the relatively high concentration of the calcium ions in the aqueous phase is outstanding. For example, a high sodium-saturated shale core recovered from the Jackson geologic section as well as cores prepared from synthetic self-disintegration or heaving shales have been maintained in contact with the aqueous phase recovered as a filtrate from the subject muds for a period of at least 3 months without showing any signs of deterioration or disintegration. On the other hand, when these same shale cores were immersed in distilled water, disintegration started immediately and was complete in a period of about one hour. Furthermore, the amount of heaving shale cuttings removed from the subject drilling muds during actual drilling operations was several times greater than ever recorded on similar wells in the same area wherein different types of drilling fluids had previously been employed. A large percentage of the shale cuttings removed from the mud stream was of a soft, gummy and sticky character such that the cuttings would ball up on the shaker screen and roll off. Illustrative of the water-sensitivity of these same shale cuttings, it was found that it was necessary during drilling through these heaving shales to operate the shaker screens without a water spray since otherwise these shale cuttings in contact with the water spray would disintegrate and wash through the screen into the mud stream.

When employing the subject muds during a drilling operation through heaving shale it is desirable to maintain the dissolved calcium content or calcium ion content of the aqueous phase (drilling fluid filtrate) at a value not under 200 parts per million by weight. For example, in actual drilling operations while drilling through seriously heaving shale formations it has been observed that when the calcium content of the filtrate dropped to a value slightly below 200 p. p. m., more particularly to a value of about 185 p. p. m., substantially none of the shale cuttings were being removed on the shaker screen. However, after adjusting the calcium content of the filtrate to a value of about 300 p. p. m. by the addition of a soluble calcium salt such as calcium chloride to the drilling mud, a definite increase in the amount of recovered shale cuttings was noticed. Accordingly, it is preferred while drilling through heaving shale to maintain the dissolved active calcium or calcium ion content available for shale suppression at a value in a range about 300–1000 p. p. m. or more by weight. Satisfactory drilling fluids, however, have been prepared containing upwards of 14,400 p. p. m. dissolved calcium.

Illustrative of the remarkable shale stabilization properties of the subject drilling muds with respect to seriously heaving shales, 100 percent recovery of unsoftened, uncontaminated shale cores were obtained from heaving shale formations which had been exposed to the subject drilling muds for periods up to two weeks. In one section of particularly dense heaving shale, three cores were shot on two separate runs and the guns were so tightly imbedded that in an attempt to recover these guns from the shale, the retracting cables of the guns broke.

The subject drilling fluids are particularly valuable when it is desired to maintain a relatively high density drilling fluid while drilling through heaving shale formations. During a drilling operation whenever shale is converted into mud-making ingredients this accumulation of low density solids often requires that the drilling fluid be diluted with water in order to maintain a satisfactory or the desired clay-water relationship properties. Accordingly, when it is desired to maintain a high density drilling fluid this continual adjustment or control of the clay-water relationship requires the addition of more weighting agent, such as barytes, to the drilling fluid in order to maintain the desired high mud weight.

In actual drilling operations carried out on the flank of the South Liberty Salt Dome, it was necessary to penetrate several thousand feet of Jackson and Yegua shales. These shales are of a disintegrating, self-dispersing type and produce sizable quantities of mud, which, although yielding a relatively good drilling fluid, is undesirable when it is desired to maintain a high density drilling fluid. The advantages of employing a drilling fluid in accordance with this invention when drilling through these seriously dispersing mud-making shales is indicated in accompanying Table I which sets forth the great saving of weighting material possible when employing the subject muds as compared to conventional drilling muds heretofore usually employed in this same area.

TABLE I

| Well No. | Total well depth in feet | Type of Drilling Fluid Employed | Weighting Agent Used | | Final Mud Wt. Desired, Lbs./Gal. |
|---|---|---|---|---|---|
| | | | Theoretical Sacks (100 lbs.) | Actual Sacks (100 lbs.) | |
| 1 | 9,500 | High pH Limed Red Oil Emulsion Mud 12.9#/gal. (Reclaimed). | 872 | 2,568 | 12.5 |
| 2 | 10,202 | Phosphate-Quebracho Mud (down to 9,527). | 1,754 | 3,018 | 11.9 |
| | | High pH Limed Mud (9,527–10,202). | −196 | 507 | 11.6 |
| 3 | 9,051 | High pH Limed Mud | 3,104 | 4,964 | 13.4 |
| 4 | 10,704 | Low pH Red-Phosphate-Oil Emulsion Mud down to 10,001 (caustic-quebracho-phosphate). | 2,053 | 5,030 | 11.8 |
| | | High pH Limed Emulsion Mud (10,001–10,704). | 2,071 | 4,124 | 13.5 |
| 5 | 8,300 | High pH Calcium Chloride Oil Emulsion Mud in accordance with this invention. | 2,060 | 2,146 | 12.1 |
| 6 | 9,957 | High pH Calcium Chloride Oil Emulsion Mud 11.0#/gal. (Reclaimed from Well No. 5). | 3,319 | 3,126 | 13.1 |
| 7 | 7,900 | High pH Calcium Chloride Mud in accordance with this invention. | 2,045 | 2,628 | 12.5 |
| 8 | 7,800 | ....do.... | 1,871 | 2,380 | 12.5 |

Wells 5–8, inclusive, were drilled with drilling fluids prepared in accordance with this invention. The negative weight material value shown following the conversion of Well No. 2 to a lime mud means that there was more than enough weight material present in the system at 11.9#/gal. mud at the time of conversion to yield the desired mud weight of 11.6#/gal. at the total depth. The 703-sack discrepancy after conversion is a measure of the amount of watering necessary to complete the last 675 feet of the well. It is to be noted that Wells No. 7 and 8 show an almost constant percentage-wise difference between the theoretical and actual amount of barites. This difference was due to the mechanical layout of the mud systems in which there existed similar large sand-settling areas whose volumes could not be calculated.

The theoretical weight material figure represents the calculated amount of weight material which would be required to raise the total volume of mud employed in the well from its original density to the final density required.

This application is a continuation-in-part of our co-pending patent application Serial No. 484,307 filed January 26, 1955.

As will be apparent to those skilled in the art many modifications, changes and substitutions are possible without departing from the spirit or scope of this invention.

We claim:

1. An aqueous drilling fluid comprising an alkaline aqueous phase which consists essentially of a saturated aqueous calcium hydroxide solution and a water-soluble calcium salt which has a solubility in said aqueous phase greater than that of calcium hydroxide dissolved therein to yield a calcium ion concentration in said aqueous phase of at least 200 parts per million by weight and sufficient to effectively stabilize and control the mud-making properties of heaving shale material in contact with the drilling fluid, said aqueous phase having a pH not greater than 12.6.

2. An aqueous drilling fluid comprising a hydratable clayey material dispersed in an alkaline aqueous phase which consists essentially of a saturated aqueous calcium hydroxide solution and a water-soluble calcium salt which has a solubility in said aqueous phase greater than that of calcium hydroxide dissolved therein to yield a calcium ion concentration in said aqueous phase of at least 200 parts per million by weight and sufficient to effectively stabilize and control the mud-making properties of heaving shale material in contact with the drilling fluid, said aqueous phase having a pH not greater than 12.6.

3. A drilling fluid in accordance with claim 2 wherein the concentration of calcium ions in the aqueous phase is in the range 300–1000 parts per million by weight.

4. A water-base drilling mud having a pH in the range 11.2–12.5 comprising an alkaline aqueous phase, a hydrated drilling clay dispersed in said aqueous phase and a dispersing agent for said clay, said aqueous phase consisting essentially of a saturated aqueous solution of calcium hydroxide and a water-soluble calcium salt which has a solubility in said aqueous phase greater than that of calcium hydroxide dissolved therein to yield a calcium ion concentration in said aqueous phase of at least 200 parts per million by weight and sufficient to effectively stabilize and control the mud-making properties of heaving shale material in contact with the drilling mud.

5. A drilling mud in accordance with claim 4 wherein said dispersing agent is a lignosulfonate.

6. A drilling mud in accordance with claim 4 wherein said dispersing agent is calcium lignosulfonate.

7. A drilling mud in accordance with claim 4 wherein said calcium salt is calcium chloride.

8. A drilling mud in accordance with claim 4 wherein said calcium salt is calcium sulphate.

9. A drilling mud in accordance with claim 4 wherein said calcium salt is calcium nitrate.

10. A drilling mud in accordance with claim 4 wherein said calcium salt is calcium acetate.

11. A drilling mud in accordance with claim 4 wherein said calcium salt is calcium formate.

12. A drilling mud in accordance with claim 4 wherein said dispersing agent is a lignosulfonate and wherein said calcium salt is calcium chloride.

13. A drilling mud in accordance with claim 4 wherein the pH of said aqueous phase is in the range 11.7–12.2, wherein said dispersing agent is calcium lignosulfonate, wherein said calcium salt is calcium chloride and wherein said aqueous phase contains a calcium ion concentration in the range 300–1000 parts per million by weight.

14. A drilling fluid in accordance with claim 4 wherein said dispersing agent is a sodium salt of a polymeric polyphenol derivative obtained as a hemlock bark extract.

15. A drilling fluid in accordance with claim 4 wherein said dispersing agent is selected from the group consisting of calcium lignosulfonate, a sodium salt of a polymeric polyphenol derivative obtained as an extract of hemlock bark and yellow dextrin which is a water-soluble degradation product of starch.

16. An aqueous drilling mud comprising an alkaline aqueous phase having a pH in the range 11.2–12.5 and a hydrated drilling clay dispersed in said aqueous phase, said aqueous phase consisting essentially of a saturated aqueous solution of calcium hydroxide and a water-soluble calcium salt which has a solubility in said aqueous phase greater than that of calcium hydroxide dissolved therein to yield a calcium ion concentration in said aqueous phase of at least 200 parts per million by weight and sufficient to effectively stabilize and control the mud-making properties of heaving shale material in contact with the drilling mud, the pH of said aqueous phase having been adjusted by the addition of an alkali metal hydroxide to the drilling mud, said calcium hydroxide having been generated in said aqueous phase by the reaction of the alkali metal hydroxide with said water-soluble calcium salt present in the drilling mud.

17. An aqueous alkaline drilling fluid containing calcium hydroxide and calcium lignosulfonate and an alkaline aqueous filtrate phase having a pH of less than 12.6, said aqueous filtrate phase consisting essentially of a saturated aqueous solution of calcium hydroxide and a water-soluble calcium salt which has a solubility in said aqueous phase greater than that of calcium hydroxide dissolved therein to yield a calcium ion concentration in said aqueous phase of at least 200 parts per million by weight and sufficient to effectively stabilize and control the mud-making properties of heaving shale material in contact with the drilling fluid, said drilling fluid containing calcium hydroxide and calcium lignosulfonate in substantially equal amounts by weight, the amount of calcium hydroxide present in said drilling fluid being at least sufficient to saturate said aqueous phase.

18. An aqueous drilling fluid containing calcium chloride, calcium hydroxide and calcium lignosulfonate in the amounts 1.5, 2 and 3 lbs. per barrel of drilling fluid, respectively, said drilling fluid having an alkaline aqueous phase possessing a pH less than 12.6 and consisting essentially of a saturated aqueous calcium hydroxide solution and a water-soluble calcium salt dissolved therein to yield a calcium ion concentration in said aqueous phase of at least 200 parts per million by weight and sufficient to effectively stabilize and control the mud-making properties of heaving shale material in contact with the drilling fluid.

19. A drilling fluid containing a dispersed hydratable drilling clay and an alkaline aqueous phase having a pH less than 12.6, said aqueous phase consisting essentially of a saturated solution of calcium hydroxide and a water-soluble calcium salt which has a solubility in said aqueous phase greater than that of calcium hydroxide dissolved therein to yield a calcium ion concentration in said aqueous phase of at least 200 parts per million by weight and sufficient to effectively stabilize and control the mud-making properties of heaving shale material in contact with the drilling fluid, said fluid having been prepared by adding to an aqueous fluid containing hydratable clayey material said water-soluble calcium salt and substantially equal amounts by weight of calcium hydroxide and calcium lignosulfonate, the amount of calcium hydroxide added being at least sufficient to saturate said aqueous phase.

20. In the drilling of a bore hole through a heaving shale formation wherein a drilling fluid is passed through the bore hole in contact with the heaving shale formation during the drilling operation, the improvement which comprises contacting said heaving shale formation with an aqueous drilling fluid comprising an alkaline aqueous phase having a pH not greater than 12.6, said aqueous phase consisting essentially of a saturated aqueous solution of calcium hydroxide and a water-soluble calcium salt which has a solubility in said aqueous phase greater than that of calcium hydroxide dissolved therein to yield a calcium ion concentration of at least 200 parts per million by weight and sufficient to effectively stabilize and control the mud-making properties of heaving shale material in contact with the drilling fluid.

21. In the drilling of a bore hole through a heaving shale formation wherein a drilling fluid is passed through the bore hole in contact with the heaving shale formation during the drilling operation, the improvement which comprises contacting said heaving shale formation with an aqueous drilling fluid comprising a hydratable clayey material dispersed in an alkaline aqueous phase having a pH not greater than 12.6, said aqueous phase consisting essentially of a saturated aqueous solution of calcium hydroxide and a water-soluble calcium salt which has a solubility in said aqueous phase greater than that of calcium hydroxide dissolved therein to yield a calcium ion concentration of at least 200 parts per million by weight and sufficient to effectively stabilize and control the mud-making properties of heaving shale material in contact with the drilling fluid.

22. A method in accordance with claim 21 wherein said aqueous drilling fluid contains a lignosulfonate as a clay dispersing agent.

23. A method in accordance with claim 21 wherein said aqueous drilling fluid contains a sodium salt of a polymeric polyphenol derivative obtained as an extract of hemlock bark as a clay dispersing agent.

24. A drilling mud additive suitable for use in the preparation of an aqueous alkaline drilling fluid having a pH less than 12.6 consisting essentially of calcium chloride, lime and calcium lignosulfonate in the weight ratio range 1:2–6:2–10, respectively.

25. An additive in accordance with claim 24 wherein said admixture consists essentially of calcium chloride, lime and calcium lignosulfonate in the weight ratio 1:3:3, respectively.

26. A drilling mud additive consisting essentially of a water-soluble calcium salt which has a solubility in water greater than that of calcium hydroxide, lime and calcium lignosulfonate in the weight ratio range 1:2–6:2–10, respectively.

27. A drilling mud additive consisting essentially of a water-soluble calcium salt which has a solubility in water greater than that of calcium hydroxide, lime and a clay dispersing agent in the weight ratio 1:3:3, respectively.

28. An additive in accordance with claim 27 wherein said clay dispersing agent is selected from the group consisting of a lignosulfonate, yellow dextrin which is a water-soluble degradation product of starch, and a sodium salt of a polymeric polyphenol derivative obtained as an extract of hemlock bark.

29. A drilling mud additive consisting essentially of a water-soluble calcium salt which has a solubility in water greater than that of calcium hydroxide, lime and a clay dispersing agent, the relative proportions of said calcium salt, lime and clay dispersing agent in said admixture being in the weight range 1:2–6:2–10, respectively.

References Cited in the file of this patent

UNITED STATES PATENTS

| | | |
|---|---|---|
| 2,371,955 | Dawson et al. | Mar. 20, 1945 |
| 2,391,622 | Dunn | Dec. 25, 1945 |
| 2,491,436 | Barnes | Dec. 13, 1949 |

OTHER REFERENCES

Rogers: Composition and Properties of Oil Well Drilling Fluids, 2nd edition, published 1953 by Gulf Publishing Co., of Houston, Texas, pages 448, 449 and 450.